US008377410B2

(12) United States Patent
Huffman et al.

(10) Patent No.: US 8,377,410 B2
(45) Date of Patent: Feb. 19, 2013

(54) PELLETIZED AMMONIUM SULFATE PARTICLES

(75) Inventors: Steven Huffman, Augusta, GA (US); James Franklin Parkinson, Evans, GA (US); Justice Fine, Evans, GA (US)

(73) Assignee: DSM IP Assets B.V., Heerlen (NL)

( * ) Notice: Subject to any disclaimer, the term of this patent is extended or adjusted under 35 U.S.C. 154(b) by 50 days.

(21) Appl. No.: 13/056,783

(22) PCT Filed: Jul. 22, 2009

(86) PCT No.: PCT/EP2009/059408
§ 371 (c)(1),
(2), (4) Date: May 23, 2011

(87) PCT Pub. No.: WO2010/012635
PCT Pub. Date: Feb. 4, 2010

(65) Prior Publication Data
US 2011/0268644 A1    Nov. 3, 2011

Related U.S. Application Data

(60) Provisional application No. 61/085,166, filed on Jul. 31, 2008.

(30) Foreign Application Priority Data

Aug. 7, 2008   (EP) ..................................... 08161986

(51) Int. Cl.
*C01B 17/96*      (2006.01)
*C01C 1/24*       (2006.01)

(52) U.S. Cl. ...................................................... 423/545
(58) Field of Classification Search .................. 423/545
See application file for complete search history.

(56) References Cited

U.S. PATENT DOCUMENTS

| 2,912,304 | A | * | 11/1959 | Vian-Ortuno et al. ........ 423/545 |
| 4,183,738 | A | | 1/1980 | Carmon |
| 4,305,748 | A | | 12/1981 | Bechthold et al. |
| 5,078,779 | A | | 1/1992 | Van De Walle et al. |

FOREIGN PATENT DOCUMENTS

| EP | 0 475 131 | 3/1992 |
| WO | WO 99/54029 | 10/1999 |
| WO | WO 99/54030 | 10/1999 |

OTHER PUBLICATIONS

International Search Report for PCT/EP2009/059408, mailed Aug. 27, 2009.

* cited by examiner

*Primary Examiner* — Timothy Vanoy
(74) *Attorney, Agent, or Firm* — Nixon & Vanderhye P.C.

(57) ABSTRACT

The invention relates to a method for preparing pelletized ammonium sulfate particles, the method comprising—providing ammonium sulfate crystals;—isolating a fraction comprising crystals having an intermediate size from crystals having a small size and from crystals having a large size, thereby obtaining remaining crystals comprised of crystals having small size and crystals having large size; and—pelletizing through a die at least part of the remaining crystals, i.e. at least part of the crystals from which the fraction comprising crystals having the intermediate size have been isolated, thereby forming pelletized ammonium sulfate particles.

17 Claims, No Drawings

PELLETIZED AMMONIUM SULFATE PARTICLES

This application is the U.S. national phase of International Application No. PCT/EP2009/059408, filed 22 Jul. 2009, which designated the U.S., claims the benefit to U.S. Provisional No. 61/085,166, filed 31 Jul. 2008, and claims priority to EP Application No. 08161986.8, filed 7 Aug. 2008, the entire contents of each of which are hereby incorporated by reference.

The invention relates to a method for preparing pelletized ammonium sulfate particles. The invention further relates to pelletized ammonium sulfate particles.

Ammonium sulfate is a useful fertilizer, e.g., for use in agriculture, horticulture or forestry. A method for preparing pelletized ammonium sulfate granules is described in DE 41 26 806 A1. The method requires the use of 2-cyanoguanidine (dicyandiamide), caprolactam oligomer or a mixture thereof as a pelletizing agent and a heat treatment at 150-175° C. of the pelletized particles (granules). According to the examples, a static granule crushing strength of up to 15.9 N may be reached for granules comprising the pelletizing agent, whereas ammonium sulfate granules without the pelletizing may have a crushing strength of up to 6.4 N (or 8.3 after a heat treatment). The method of measuring the crushing strength is not described.

DE 41 26 807 A1 describes a method for improving the crushing strength of ammonium sulfate granules, wherein ammonium sulfate having a water content of 1.3% or less is mixed with urea-formaldehyde precondensate and pressed. According to the examples, a single granule crushing strength of 23.5 N and an abrasion resistance of 92.4% may be reached (compared to 9.5 N respectively 76% for ammonium sulfate pressed without the precondensate). Method conditions for determining these parameters are not described in detail.

GB 1 011 463 relates to a pellet comprising solid fertilizer particles bound together by a water repellent binder material, such as a hydrocarbon (mixture), such as asphalt, or a hydrophobic polymer. The pellets may be prepared by extrusion. The preparation typically requires heating of the binder above its melting point.

EP 1 884 506-A2 describes granulation of almost dry ammonium sulfate crystals in a flat die pelletizer. In said process the crystals first need to be fully coated with a fine solid coating material with water absorbing properties by means of turbulent mixing. Subsequently, a precise amount of water needs to be sprayed onto the coated crystals, and pelletizing takes place without control of pellet size. The product obtained is then dried and cut to size, and size classified with recycle of rejected product.

It is an objective of the invention to provide a novel method for preparing pelletized ammonium sulfate particles.

It is in particular an objective of the invention to provide pelletized ammonium sulfate particles, suitable for use as a fertilizer, from ammonium sulfate crystals obtained by crystallization from a liquid, wherein all or substantially all sizes of the crystals obtained can be used to provide a fertilizer with properties that are appreciated by the user.

It is a further objective to provide pelletized ammonium sulfate particles with a more uniform particle size distribution and/or better flowing properties than ammonium sulfate crystals.

It is still a further objective to provide pelletized ammonium sulfate particles which easily can be subjected to shaping by applying mechanical force (e.g. friction), by an additional coating step, etc.

It is a further objective to provide a method for making pelletized ammonium sulfate particles from an ammonium sulfate crystallization process at high over-all yield of commercially attractive desired product (separately providing a crystal fraction with good properties, as well as providing a fraction of pelletized particles), which allows very high conversion, even up to 100% conversion, of the crystalline material obtained in the ammonium sulfate crystallization process into commercially attractive products, in particular in respect of storage, transport, flowability and blending properties.

It is further an objective to provide novel pelletized ammonium sulfate particles that have satisfactory particle crushing strength.

One or more other objectives that may be met in accordance with the invention will follow from the description below.

It has now been found possible by pelletizing through a die to prepare ammonium sulfate particles from ammonium sulfate crystals, with satisfactory properties for using the particles, e.g. as a fertilizer, by selecting suitable crystals in a specific way.

Accordingly, the present invention relates to a method for preparing pelletized ammonium sulfate particles, the method comprising providing ammonium sulfate crystals;
isolating from these crystals a fraction comprising crystals having an intermediate size from crystals having a small size and from crystals having a large size, thereby obtaining remaining crystals comprised of crystals having small size and crystals having large size; and
pelletizing through a die at least part of the remaining crystals—i.e. at least part of the crystals from which the fraction comprising crystals having the intermediate size have been isolated—thereby forming pelletized ammonium sulfate particles.

The term "fraction comprising crystals having an intermediate size" also may be referred to as "mid-cut" or "mid-cut fraction". As will be clear to the skilled person, the terms "small", "intermediate" and "high" are used into relation to each other, and are not necessarily meant to be limited to a specific absolute size. Together the small, intermediate and large size fractions form the total product from which the intermediate size fraction is isolated.

The invention further relates to pelletized ammonium sulfate particles obtainable by a method of the invention.

As used herein, the term ammonium sulfate crystal is used for all ammonium sulfate particles that have been formed by crystallization from solution.

As used herein, the term pelletized ammonium sulfate particles is used for (pelletized) particles at least substantially consisting of ammonium sulfate. Usually, the ammonium sulfate particles comprise 90-100 wt. %, preferably at least 95 wt. %, more preferably at least 96.5 wt. %, in particular 98 wt. % or more, more in particular 99.0 wt. % or more, even more in particular 99.5 wt. % or more ammonium sulfate, based on total weight. Further, one or more of the following components may be present: water, additional nutrient (e.g. one or more trace elements), processing additives (e.g. a binder), e.g. from the ammonium sulfate crystals used to prepared to pelletized particles, colorants, flow enhancers, etc. More details about the additional components will follow below.

Suitably the pelletizing takes place through a die. In principle, the die comprises at least one hole, but is usually provided with a plurality of die holes. The open area of the die is preferably about 20-30% of the total area of the die in contact with the crystals to be pelletized. The length of the die holes is generally chosen in the range of from 0.2*diameter up to 5*diameter. Preferably, the length of the die holes is chosen in the range of from 2*diameter up to 3.5*diameter of the holes. Further improved conditions can be assessed by the skilled man in dependence of throughput, additives used, etc. based on the present disclosure, optionally in combination with common general knowledge and some routine testing.

The pelletized particles may in particular have an at least substantially cylindrical shape, as is common for extrudates. It should be noted that the term cylindrical is used herein the broad sense and thus includes cylinders having a cylindrical cross section, cylinders having a ellipsoid cross section and cylinders having a polygonal cross section. In the present invention, alternatively, the size of the cross-sectional area of the cylindrically shaped particles may vary along the longitudinal axis of the particles.

The invention further relates to pelletized ammonium sulfate particles, comprising at least 90 wt. % ammonium sulfate, which particles have a crushing strength as determinable by the IFDC S-115 test (see below) which is on average above 2.5 kg/pellet, or even above 2.75 kg/pellet, in particular even above 3.0 kg/pellet. The upper value is not critical, but may be up to 3.5 kg/pellet, or even up to 4.0 or higher. The crushing strength may for instance be as high as the crushing strength of an ammonium sulfate crystal (which is at about 40 N) or higher. In particular, the crushing strength may even be up to 50 N. It is an additional advantage of the present invention, that pelletized ammonium sulfate particles can easily be provided according to market requirements as to crushing strength and/or other properties, such as size and shape, by simply adjusting the pelletizing device and process parameters such as feed conditions (e.g. humidity of the feed; pressure applied; pressure drop over the die; etc.). Usually, the pelletized ammonium sulfate particles provided according to the invention will have a crushing strength on average at or above 40 N.

As used herein, the crushing strength is the value as determinable by a method based on IFDC S-115, described at pages 51-52 of "Manual for Determining Physical Properties of Fertilizer", 2nd Edition, prepared by W. Rutland, issued by the International Fertilizer Development Center, Muscle Shoals, Ala. (USA), February 1993. Hereinafter, this manual will be referred to as "IFDC". For elongate particles, such as at least substantially cylindrically shaped particles, as are common for extrudates, in particular the crushing strength is measured in the direction perpendicular to the longitudinal direction (perpendicular to the generating line, such as the cylinder axis) is meant.

Advantageously, in a method of the invention, the size of the crystals of intermediate size may be chosen such that the isolated intermediate fraction comprising these particles has a desirable size range for being used as a fertilizer without any further size altering treatment.

In principle, independently of the size classes used for making the feed for producing the pelletized particles, the size of the pelletized ammonium sulfate particles can be chosen in any range by choosing a suitable die or mold for the particles. Usually, the maximum particle size of the crystals in the infeed is not critical. In an embodiment at least 80%, in particular at least 90%, more in particular at least 95% by volume of the intermediate fraction is formed by ammonium sulfate crystals having a size range, as can be determined by screen analysis, chosen within the range of from 0.05 to 4 mm, preferably either within the range of from 0.05 to 2 mm (which is a range highly preferred in the ammonium sulfate market for smaller crystals), or within the range of from 2 mm to 4 mm (which range is preferred for granular ammonium sulfate products). The remaining crystals, which are considered less suitable or at least less appreciated by users of the crystals (as fertilizer), can then totally or partially be pelletized in accordance with the invention, to provide pelletized ammonium sulfate particles, in particular for use as a fertilizer. Thus, the invention allows a high level of freedom in choosing crystallization conditions (which may affect particles size distribution as an intended effect or as a side-effect) and still be able to provide final products with a specific diameter, using all or substantially all of the crystals. It should be noted that particle size, and in particular a high degree of particle size uniformity, can be considered an important factor by end-users, for instance because it may affect the ease of distributing the pelletized particles, in particular when used as a fertilizer.

Compared to conventional ammonium sulfate crystals (used as fertilizer), the pelletized particles of the invention may in particular offer a higher size uniformity (as defined by the uniformity index, see below) and/or offer a higher mean size. Further, pelletized particles of the invention may be smoother. Further, they may have one or more other improved properties, such as selected from the group of improved crushing strength and improved abrasion resistance. Moreover, it is advantageous that the pelletized ammonium sulfate particles can easily be mixed with crystalline ammonium sulfate particles, or any other fertilizer particles, of the same size range.

In accordance with the invention it is surprisingly possible to prepare particles with satisfactory or even improved product properties, also without having to include a binder (such as asphalt, a hydrophobic polymer etc.) or at least without having to include much of a binder. It should be noted that at least a considerable number of binders used in methods according to the prior art, may be undesired for one or more reasons. For instance, such may be detrimental to a plant for which the ammonium sulfate is used as a fertilizer or to a consumer of a feed or food which may be prepared from the plant. Some binders may be disadvantageous from an environmental viewpoint (e.g. hydrophobic synthetic polymers such as polyolefins, or asphalt are badly biodegradable). Further, a binder or precursor thereof may be toxic (such as formaldehyde) or harmful (such as 2-cyanoguanidine). It is a further advantage of the process of the present invention that ammonium sulfate pellets can be obtained, which do not comprise any insoluble matter.

It has in particular been found possible to prepare by pelletizing through a die pelletized particles with satisfactory or even improved product properties, also without needing a (synthetic) organic binder.

One or more properties that may be improved in accordance with the invention may in particular be selected from the group consisting of absorption penetration (IFDC S-100), critical relative humidity (IFDC S-101), flowability (IFDC S-102) chemical compatibility in blends (IFDC S-106), caking tendency (IFDC-106), physical compatibility in blend (IFDC S-109), angle of repose (IFDC S-110), loose bulk density (IFDC-111), tapped bulk density (IFDC S-112), apparent density (IFDC S-113), true density of solids (IFDC S-114), crushing strength (IFDC S-115), abrasion resistance (rotary drum test IFDC S-116), disintegration rate in water (IFDC S-124) and porosity (IFDC S-125).

The invention is further advantageous in that the pelletizing can be accomplished adequately without having to actively heat the crystals from which the pelletized particles are made to allow mixing with a binder that needs to be molten or without having to heat the particles to a high temperature (e.g. of 150° C. or more) in order to cure or fuse (binder) in the particles, as is required in some of the prior art methods. Of course, if desired the method may involve a heat treatment, e.g. an additional drying step to remove water. However, in general the method according the invention may in general be carried out without subjecting the feed to the device for pelletizing takes place or the pelletized particles to a temperature exceeding 100° C.

The term "or" as used herein means "and/or" unless specified otherwise.

The term "a" or "an" as used herein means "at least one" unless specified otherwise.

When referring to a noun (e.g. a compound, an additive etc.) in singular, the plural is meant to be included. Thus, when referring to a specific noun, e.g. "compound", this means "at least one" of that noun, e.g. "at least one compound", unless specified otherwise.

Crystals used for preparing the pelletized particles may be provided based on a manner known in the art, in particular by crystallization from a liquid comprising ammonium sulfate. Such liquid may in particular originate from a process wherein caprolactam is prepared. The isolation of the crystals may be accomplished in a manner known per se, e.g. by separating the crystals from the liquid, e.g. by centrifuging, thereafter optionally drying the crystals and finally screening or otherwise separating the crystals according to size.

As indicated above, the isolated fraction comprising particles of intermediate size may be used without a further size altering treatment, as a fertilizer.

If desired, the fraction comprising crystals having an intermediate size includes crystals having a size that is about the same as the diameter of the pelletized particles.

Typically, the remaining crystals are separated into a fraction comprising crystals having a small size and a fraction comprising crystals having a large size, although in principle this is not necessary.

At least part of the remaining crystals is used for preparing pelletized ammonium sulfate particles. If crystals are used that have a size exceeding the intended size of the pelletized particles, these crystals may be subjected to a size reducing pre-treatment, e.g. by grinding or milling, prior to feeding to the device wherein pelletizing takes place. At least in some embodiments it is possible to directly feed such large crystals to the device wherein pelletizing takes place and fracture the crystal in the device wherein pelletizing takes place, e.g. by the force of the screw or screws in a screw-extruder, by rolls in a roller compacter, e.g. a Kollergang (pan grinder), or by gears in a gear pelletizer, e.g. a vertical pellet mill.

The crystals may be fed into the device wherein pelletizing takes place without needing to provide them with a coating, such as a coating that enhances adhesion of crystals to each other. It is to be noted that EP 1 884 506-A2 even requires that the ammonium sulfate crystals are fully surrounded by coating by mixing them with a solid additive.

In particular for a high crushing strength and/or high abrasion resistance it is considered advantageous to feed a crystal feed to the device wherein pelletizing takes place having a wide particle size distribution or to create such a particle size distribution in the device before the pelletizing step. The distribution may be monomodal (with a high weight average particle size to number average particle size ratio) or polymodal (i.e. at least bimodal).

It is an advantage of the invention that in principle pelletized particles even may be prepared without using any further binders or other additives (in addition to residual moisture that may be present in the crystals used)

In practice, it may however be advantageous to include one or more additives, e.g. an additive affecting a physical property, an additive affecting the release profile of the ammonium sulfate, a trace element (e.g. Cu, Zn, Mn, Mo), or a colourant. In general, if used at all such additives are included in a minor amount compared to the ammonium sulfate. Usually the total amount of additives is 20 wt. % or less, based on the total weight of the feed to be pelletized, preferably 10 wt. or less, in particular 4 wt. % or less, more in particular 2.0 wt. % or less, or 1.0 wt. % or less, or 0.5 wt. % or less, based on total weight of the feed.

In a specific embodiment, the feed for the device wherein pelletizing takes place (and the pelletized particles) comprises a binder, usually in a concentration of 10 wt. % or less, in particular in a concentration of 5 wt. % or less, preferably in a concentration of 2 wt. % or less, in particular in a concentration of 1.0 wt. % or less, more in particular in a concentration of 0.5 wt. % or less, based on total weight. If present, the binder concentration is usually at least 0.01 wt. %, in particular at least 0.1 wt. %, or at least 0.3 wt. %.

In particular a suitable binder may be selected amongst binders that are generally regarded as safe (GRAS) for a food application, such as from the group of GRAS polysaccharides, GRAS clays. Examples of suitable polysaccharides in particular include starch, cellulose, and GRAS derivatives thereof, e.g. carboxymethylcellulose). Examples of suitable clays in particular include kaolin, bentonite clay, attapulgite clay and Fuller's earth. Also, a lignosulfonate may be used.

In order to modify the flow behavior of the feed inside the pelletizing device (in particular inside the die, or at the mold of a molding device), a minor amount of a liquid or solid flow modifier may be added to the ammonium sulfate crystals, in particular water. If used, the concentration of added flow modifier is generally 10 wt. % or less, in particular 6 wt. % or less, more in particular 5 wt. % or less, based on total weight. If used, the concentration of added liquid is usually at least 0.1 wt. %, in particular at least 1 wt. %, more in particular at least 2 wt. %, at least 3 wt. % or at least 4 wt. % based on total weight. If desired, the liquid may be removed from the pelletized particles after pelletizing. This may be accomplished in a manner known per se, e.g. by (mildly) heating the pelletized particles, e.g. to a temperature of up to 80° C. If desired a higher temperature may be used, but this is generally not necessary. Thus, pelletized particles may be obtained having a liquid (moisture) content of less than 1.0 wt. %, less than 0.5 wt. %, 0.2 wt. % or less, or 0.1 wt. % or less.

Pelletizing through a die may be performed using any type of pelletizing device, wherein the pelletized particles are formed by a method involving pressing feed (comprising ammonium sulfate crystals) through a die. In particular suitable, is an extruder selected from the group of screw extruders, Kollergang extruders (pan grinders) and gear pelletizers. Another example of a suitable pelletizing method is pelletizing using a roller pelletizing device.

It is contemplated that the use of a screw extruder is in particular advantageous for providing pelletized ammonium sulfate particles with a high crushing strength and/or a high abrasion resistance, also in the absence of an added binder and/or added water.

The use of a Kollergang is in particular advantageous for providing ammonium sulfate particles with satisfactory crushing strength and satisfactory abrasion resistance, at a relatively high throughput.

It is to be noticed that in the state of the art various other methods are described for preparing ammonium sulfate particles, but none of these is to be considered a technique for pelletizing through a die according to the present invention. Examples of such documents are U.S. Pat. No. 4,183,738 A (granulation technique, e.g. by pan granulation), U.S. Pat. No. 4,305,748 A (spray drying granulation of finely divided ammonium sulfate), WO/9954030 (wet granulation with high amount of binder), U.S. Pat. No. 5,078,779 A (wet granulation with reactive binder), etc.

It is, moreover, to be noted that pelletizing of kieserite, a highly unstable magnesium sulfate monohydrate, through a die, and all types of equipment suitable therefor, is studied in a thesis of A. Hoche (Technische Universität Bergakademie Freiberg, Germany; Sep. 13, 2007). There are no clues as to pelletizing through a die of ammonium sulfate as such. The only mentioning of ammonium sulfate in this thesis is in the context of using ammonium sulfate as a granulation aid, as disclosed in DE-2748152.

In accordance with the invention, the pelletizing may be carried out without actively heating or cooling the die, although—in principle—this is possible. For instance, the feed for the pelletizing device may be added to the extruder at about ambient temperature (e.g. 15-25° C.). Due to friction, pelletizing generally leads to an increase in temperature, unless the pelletizing device is cooled. Thus, temperature of the particles leaving the pelletizing device tends to be higher than the temperature of the feed. A method of the invention may usually be carried out to under conditions (as will be determinable by the skilled person) wherein the temperature of the particle granule leaving the pelletizing device is below 100° C., in particular at a temperature of about 90° C. or less, more in particular at a temperature of about 80° C. or less. The temperature of the particles leaving the die may for instance be at least 50° C., in particular at least 65° C. Good results have been achieved in a method wherein the temperature exceeded 70° C.

The pelletized particles may be subjected to a further treatment, in particular a finishing treatment, e.g. rounding off edges of the particles. Finishing may be done in a manner known per se for treating extrudates in general.

If desired, the pelletized particles may be provided with a coating e.g. a protective coating or a coating to alter the release pattern of the ammonium sulfate. However, in particular uncoated pelletized ammonium sulfate particles may advantageously be used as a fertilizer, in accordance with the invention.

In addition to ammonium sulfate (as identified above), the particles may comprise one or more other ingredients (also identified above).

In a preferred embodiment, the pelletized, optionally dried, ammonium sulfate particles comprise 0-2.0 wt. % binder, in particular an inorganic binder, 0-0.5 wt. % water and at least 98 wt. % ammonium sulfate, based on total weight. In a particularly preferred embodiment, the ammonium sulfate content is at least 99 wt. %, the content of binder, in particular inorganic binder, is 1.0 wt. % or less and the water content is about 0.2 wt. % or less. In a specific embodiment the ammonium sulfate content is 99.9-100 wt. %, any balance being water and/or impurity.

It is an advantage of the invention that particles may be defined having well defined dimensions (with only a small standard deviation) over a broad range, e.g. having a number average diameter in the range of about 0.3 mm to about 10 mm.

Size guide number (SGN) usually is in the range of from 50 to 10 000.

The uniformity index (UI), an index which can be determined according to standard measurements and calculations known to the skilled man in fertilizer industry, preferably should be in the range of from 40 to 75, more preferably of from 45 to 65, most preferably from 50 to 60. If the UI is too low or too high the pelletized product cannot be suitably used in combination with other fertilizer products and distribution on the field might be less accurate.

In particular, pelletized particles may be prepared having a size in at least one dimension (typically the average diameter of the cylindrically shaped particle in the range of 0.3-10 mm. According to the invention, cylindrically shaped particles may be obtained in a readily adjustable length, usually in the range of from 0.2*diameter up to 15*diameter, preferably of from 0.5*diameter to 5*diameter, most preferably at about the same dimension as the average diameter of the particles.

In a specific embodiment, pelletized ammonium sulfate particles according to the invention, have an abrasion resistance, as determinable by S-116 (see elsewhere in this application), of at least 0.75%, in particular of at least 0.80%, more in particular of at least 0.84%. The upper limit is not critical. In practice, it may be up to 0.95% or even up to 0.98%, or at most up to 1.0%.

The invention will now be illustrated by the following examples.

EXAMPLE 1

Ammonium sulfate crystals were obtained from an ammonium sulfate crystallizer. The crystalline material was screened in such way as to obtain about 50 wt. % of a mid-cut fraction which could be marketed as such in the crystal form (average particle size in the range of from 2 to 3 mm). Under- and oversized particles were combined and used for the pelletizing step.

These ammonium sulfate crystals were subjected to a size reduction treatment using a hammer mill to an average size of about 150 μm (97% of the particles passed through a #100 tyler mesh screen). These ammonium sulfate particles then were blended with 1 wt. % kaolin (Suprex™; Kentucky-Tennessee Clay Company, Langley, S.C., USA) in a Batch Sigma Blade Kneader model KDHJ-20 and then mixed with 6 wt. % of water.

This wet mixture was fed, at a stable rate of 320 kg/hr, at ambient conditions to a Kahl pellet press model 33-390 (a vertical pellet mill) by a Circle Feeder Model CS-300 system (Amandus Kahl GmbH, Reinbek, Germany). The press comprised a 390 mm diameter die (having a 3:1 compression ratio (9.0 mm pressway/3.0 mm diameter), a main shaft, two rollers and a pellet breaking device under the die. The equipment was operated at a hydraulic pressure of $8.0*10^6$ Pa, and at a shaft speed of 80 rpm, while the motor drew 38 amps. The residence time was 36 sec. The temperature of the particles exiting the die was 73° C.

Subsequently, the pelletized ammonium sulfate particles produced were dried batch-wise in a tumble dryer until a moisture content of less than 1.0 wt. % was reached. In this drying step the pellets achieved a smooth and uniform appearance. Properties of the pellets were determined according to standard testing methods of IFDC (International Fertilizer Development Center, Muscle Shoals, Ala.). In particular IFDC tests S-101 (critical relative humidity), S-102 (flowability), S-115 (crushing strength), and S-116 (rotary drum abrasion resistance) were performed. The results, in part summarized in table I, show that these properties of the pelletized ammonium sulfate particles obtained were clearly better than for ammonium sulfate crystals.

TABLE I

| Test | Property | Dimension | Crystals (typical value) | Pellets of Ex. 1 |
|---|---|---|---|---|
| S-101 | Critical relative humidity | % | 75-85 | 80-85 |
| S-102 | Flowability 25% non flow | min | 175 | 185 |
|  | Flowability 50% non flow | min | 220 | 275 |
|  | Flowability 75% non flow | min | 280 | 295 |
| S-115 | Crushing strength | kg/pellet | 1.5-2.5; average 2.0 | 2.0-3.0; average >2.5 |
|  | Idem, translated*) into N | N | 30-50; average 40 | 40-60; average >50 |
| S-116 | Rotary drum abrasion resistance | % | 0.2-1 | 0.84 |

*)conversion factor kg/pellet to N is based on comparable measurements by inventors as to average crushing strength for crystals The Uniformity Index of the pelletized ammonium sulfate particles was determined at 53, at a SGN (Size Guide Number) determined at 301.

Storage, transport and other properties of the pelletized ammonium sulfate particles are all at least comparable to those properties for ammonium sulfate crystals.

EXAMPLE 2

Example 1 was repeated, but the crystalline ammonium sulfate material obtained from the ammonium sulfate crystallizer was screened in such way as to obtain about 40 wt. % of a mid-cut fraction having an average crystal diameter of 1.5 mm which could be marketed as such. Again, under- and oversized particles were combined and used for the pelletizing step.

Results were almost identical to the results achieved in Example 1.

EXAMPLE 3

As in Example 1, the crystalline ammonium sulfate material obtained from the ammonium sulfate crystallizer was screened in such way as to obtain about 50 wt. % of a mid-cut fraction having an average crystal diameter of 2-3 mm which could be marketed as such. 100 wt. % of the undersized fraction, and 20 wt. % of the oversized particles were combined and used for the pelletizing step, which now was performed, at a stable feed rate of about 2 kg/h, in a California Pellet Mill, without any further pre-conditioning of the crystal material. Accordingly, no milling took place, and no binder was added.

Uniform pelletized ammonium sulfate particles with a crushing strength which was about 20% higher than that of the crystalline material could be obtained. No further drying of the pelletized material was needed.

The invention claimed is:

1. A method for preparing pelletized ammonium sulfate particles, the method comprising:
   providing ammonium sulfate crystals;
   isolating from the ammonium sulfate crystals a fraction comprising crystals having an intermediate size from crystals having a small size and from crystals having a large size, thereby obtaining remaining crystals comprised of crystals having small size and crystals having large size; and
   pelletizing through a die at least part of the remaining crystals from which the fraction comprising crystals having the intermediate size have been isolated, thereby forming pelletized ammonium sulfate particles.

2. The method according to claim 1, wherein the fraction comprising crystals having an intermediate size includes crystals having a size that is about the same as the diameter of the pelletized particles.

3. The method according to claim 1, wherein the remaining crystals are separated in a fraction comprising crystals having a small size and a fraction comprising crystals having a large size.

4. The method according to claim 3, wherein at least part of each of both of said fractions are used for the preparation of pelletized ammonium sulfate particles, and wherein at least said part from the fraction comprising crystals having a large size is subjected to a crystal size reduction treatment, prior to pelletizing.

5. The method according to claim 1, wherein the ammonium sulfate crystals are pelletized together with at least one component selected from the group consisting of binders and water prior to pelletizing.

6. The method according to claim 5, wherein the concentration of water is 2-10 wt. %, the concentration of binder is 0.01-10 wt. % and the concentration of ammonium sulfate is 80-98 wt. %, all based on the total weight.

7. The method according to claim 5, wherein the obtained pelletized particles are subjected to drying to a moisture content of less than 1.0 wt. %.

8. The method according to claim 7, wherein the obtained pelletized particles are subjected to drying to a moisture content of 0.2 wt. % or less.

9. The method according to claim 1, wherein, optionally after removal of water, the pelletized particles comprise at least 95 wt. % ammonium sulfate.

10. The method according to claim 9, wherein, the pelletized particles comprise at least 96.5 wt. % ammonium sulfate.

11. The method according to claim 9, wherein the pelletized particles comprise at least 98 wt. % ammonium sulfate.

12. The method according to claim 9, wherein, the pelletized particles comprise at least 99 wt. % ammonium sulfate.

13. The method according to claim 1, wherein the pelletizing takes place in a screw extruder, in a roller pelletizer, or in a gear pelletizer.

14. The method according to claim 1, wherein the pelletized particles are subjected to a finishing treatment.

15. Pelletized ammonium sulfate particles, comprising at least 90 wt. % ammonium sulfate, the particles having a crushing strength as determinable by the IFDC S-115 test which is on average above 2.5 kg/pellet.

16. The pelletized ammonium sulfate particles according to claim 15, comprising at least 98 wt. % ammonium sulfate.

17. The pelletized ammonium sulfate particles according to claim 15, comprising at least 99 wt. % ammonium sulfate.

* * * * *